United States Patent [19]

Lehureau

[11] Patent Number: 5,396,482
[45] Date of Patent: Mar. 7, 1995

[54] SYSTEM FOR READING OPTICAL DISKS AND OPTICAL DISKS READABLE BY THIS SYSTEM

[75] Inventor: Jean-Claude Lehureau, Sainte Genevieve des Bois, France

[73] Assignee: Thomson-CSF, Puteaux, France

[21] Appl. No.: 911,083

[22] Filed: Jul. 9, 1992

[30] Foreign Application Priority Data

Jul. 9, 1991 [FR] France ................ 91 08606

[51] Int. Cl.⁶ ................................ G11B 5/09
[52] U.S. Cl. ...................... 369/103; 369/100
[58] Field of Search ........... 369/100, 103, 112, 116; 359/19

[56] References Cited

U.S. PATENT DOCUMENTS

| | | | |
|---|---|---|---|
| 3,911,230 | 10/1975 | Neidell . | |
| 3,992,593 | 11/1976 | Heine . | |
| 5,206,850 | 4/1993 | Tezuka et al. | 369/100 |
| 5,214,633 | 5/1993 | Tanno et al. | 369/112 |
| 5,224,082 | 7/1993 | Kurokawa et al. | 369/112 |
| 5,233,582 | 8/1993 | Tanno et al. | 369/100 |

FOREIGN PATENT DOCUMENTS 0190698  8/1986  European Pat. Off. .
0418879  3/1991  European Pat. Off. .
4036615  5/1991  Germany .

*Primary Examiner*—Paul M. Dzierzynski
*Assistant Examiner*—Don Wong
*Attorney, Agent, or Firm*—Oblon, Spivak, McClelland, Maier, & Neustadt

[57] ABSTRACT

A system for the reading of information elements stored in optical form makes use of the fact that the light of the illumination source of the optical disk is a coherent source to constitute a hologram on an array of photodetectors. This hologram is the composition of the unmodulated incident beam of the source with the beam reflected by the disk, modulated by the information elements to be read. An operation comprising signal processing by Fourier transform, shifting in the spatial frequencies plane and reverse Fourier transform is used to reach the information elements recorded on the disk. The detection of the information elements can be far more complete than in the case of the conventional reading of optical disks for it brings into play not only the total modulation of light energy of the laser beam but also the phase modulation. This makes it possible to increase the information storage density, reduce the precision needed for the optical and mechanical systems of the reader and carry out electronic signal processing operations to correct optical system defects and focusing defects.

14 Claims, 2 Drawing Sheets

SYSTEM FOR READING OPTICAL DISKS AND OPTICAL DISKS READABLE BY THIS SYSTEM

BACKGROUND OF THE INVENTION

1. Field of the Invention

The invention relates to the reading of information recorded in optical form.

Optical disks, namely disks containing information that can be read by optical systems, are now well known.

2. Description of the Prior Art

These disks work on the following principle: the information elements are most often constituted by holes etched along circular tracks separated by inter-track spaces devoid of holes. A laser focused on a small surface illuminates the tracks (and partially also the inter-track space). The disk rotates beneath the laser so that only one track at a time moves past beneath the focused beam. The beam is reflected towards a photodetector and the reflection coefficient depends on the presence or absence of a hole in the track. The passing of the holes beneath the beam thus produces a modulation of the amplitude of the reflected beam. The photodetector produces a signal modulated accordingly, representing the moving past of the holes. It is this signal that enables the reconstitution of the useful information, namely the position of the holes along each of the tracks, or the geometry of these holes.

In this technique, the plane surface of the disk between the tracks acts as a reference plane for the detection of the useful information.

It is possible to store information at high densities provided that the laser beam can be very well focused on very small holes along very narrow tracks.

This assumes notably that there are very highly precise focusing objectives devoid of aberrations and positioned with very high precision laterally to the tracks and vertically to the reference surfaces of the disk. This also assumes working with reading lasers of the shortest possible wavelength, which is not always compatible with low manufacturing costs.

It is an aim of the invention to propose a reading system that reduces the constraints related to the present reading techniques, so as to provide for a more efficient compromise between manufacturing costs (the cost of the laser focusing optical systems, the positional servo-control mechanical systems and the laser itself) and performance characteristics (information storage density, quality of the information elements restored etc.).

The central idea of the invention entails the carrying out not of a simple detection of the amplitude (light energy) of the laser beam modulated by the stored optical information elements but of a combined detection of amplitude and phase of the coherent optical wave of the modulated laser beam.

Indeed, when a wavefront of a coherent magnetic wave (a laser emits a coherent electromagnetic wave of this type) encounters an obstacle constituted in this case by an optical information element (a hole etched in a plane surface or another disturbance in the path of the wave), the wavefront is deformed and then conveys a complex information element (complex in the mathematical sense of the term, relating to amplitude and phase) directly related to the constitution of the obstacle.

The modulation of energy of the modulated beam (for example the beam reflected by the surface of an optical disk) is only a component of this complex information element. It is the easiest component to detect. The complex information, which is the amplitude and the phase of the wave at each point of the space or, again, the exact shape of the wave front modulated by the obstacle, is more abundant than the simple information on the total energy of the reflected beam. But, naturally, it is not easy to detect. Indeed, the photodetectors measure only a received energy.

SUMMARY OF THE INVENTION

The invention proposes a system for the reading of optical information elements comprising means to make a reference laser beam interfere with this same beam modulated by optical information elements to be read, to create a pattern of spatial interference fringes on a set of photodetectors distributed in a spatial zone where these fringes are present, and means to process the information elements on the amplitude and spatial phase of the interference fringes to reconstitute the optical information elements that have generated the pattern of fringes.

When a coherent light beam is modulated by an obstacle representing an optical information element, it may be combined with the same beam in unmodulated form. This creates a hologram, namely a particular pattern of interference fringes. This pattern has the property of containing, in concealed form, all the information relating to the obstacle that has modulated the beam.

The idea of the invention is to use this property to read the information elements of an optical disk, by projecting this hologram on a set of photodetectors and by then processing the signals coming from the photodetectors to retrieve the initial optical information element. This information element is retrieved in a more complete form than in the conventional reading systems for it includes information elements on the phase of the modulated electromagnetic wave. Indeed, the setting up of a hologram by the composition of a reference beam and of the modulated beam does not make these phase information elements disappear. In the conventional reading systems, on the contrary, the phase information element disappears completely.

The very major advantages of this new reading mode include the following:

the possibility of using optical systems of lower precision owing to the fact that laser beam can illuminate several tracks at a time, the distinction between the information elements corresponding to the different tracks being made by electronic signal processing;

the possibility of the correction, by electronic signal processing, of the defects of the optical systems and, notably, of the aberration and focusing defects;

and, consequently, the possibility of using mechanical servo systems of lower precision, both vertically above the surface of the optical disk and radially in order to remain on a track;

the possibility of eliminating the inter-track spaces in the storage disks, for it is no longer necessary to have a reference surface for the reading of each optical information element. A general approximate reference may suffice. By eliminating the inter-track spaces, it is then possible to almost double the density of optical information elements stored in a given surface;

the possibility of further improving the storage density by the establishing of the amplitude and phase information elements of the reflected beam in such a way that they can be distinguisued, or by carrying out a phase discrimination with structures of etched holes that lend themselves thereto (namely structures that introduce quantifiable phase shifts).

It is moreover worth noting that, in the conventional reading systems, there is already practically a reference beam which may be used, according to the invention, for the constitution of the interference fringes. Indeed, in the conventional systems, because it is necessary to separate the incident laser beam from the modulated reflected beam, a semi-transparent separation plate is used. Half of the light energy of the incident laser beam is lost in this operation. The invention will use this lost half to set up a reference beam which will be used to compose the modulated beam in order to constitute the fringes.

In practice, for essentially mechanical reasons, preference will continue to be given to storage on rotating disks, with a reading head fixed to the top pf the surface of the disk containing the information elements.

In this case, a set of photodetectors in the form of a linear array could be used. This array will be positioned in such a way that it receives and can detect the interference fringes that result from the modulation of the laser beam by a set of information elements positioned radially on the disk.

In other words, if the laser beam is focused so as to illuminate a radial segment of the disk (possibly including several juxtaposed tracks), the array will be positioned in an image zone of this segment in relation to the optical focusing system of the laser beam; and the reference beam will be oriented in relation to the modulated return beam in such a way that its composition with the modulated beam produces interference fringes distributed along this array.

The reference laser beam and the modulated beam are both sent on towards the photodetectors, the incidence of the reference beam being sufficiently oblique in relation to that of the modulated beam to generate interference fringes, without being too oblique all the same, given the distribution pitch of the photodetectors in the array, so that the pitch of the fringes is not excessively reduced and so that it is possible, by means of the array of photodetectors, to carry out measurements of spatial phase and amplitude of these fringes.

The signal processing used to reconstitute the stored optical information elements from the signals coming from the photodetectors will, on the whole, be as follows: 2D Fourier transform of the signals, signal processing on the Fourier transform to eliminate the component of spatial frequency corresponding to the unmodulated reference beam and to keep only the component of the modulated beam (this processing is a simple translation in the spatial frequencies domain), signal processing if necessary on the Fourier transform for the correction, for example, of the aberrations of the focusing lenses or of focusing defects; and reverse Fourier transform to pass again from a function in the frequency domain to a function in the real domain, this function representing the optical information elements recorded in the disk.

If the disk were not to rotate (this is in fact improbable), the photodetectors would be arranged in a 2D matrix and the Fourier transform would be a transform in a 2D domain of spatial frequencies.

But in the more promising example of a rotating disk, the photodetectors will be arranged in linear array form and the Fourier transform will be a spatial and temporal transform of the signals, variable in time, that have come from the detectors as and when the disk moves past. The reverse transform will cause a return from a function in the 2D spatial frequency and temporal frequency domain to a function in the real domain of space (corresponding to a one-dimensional space which is radial) and time providing a representation, in the form of electrical signals, of the information elements recorded along a radial segment of the disk and their moving past in time.

The correction processing operations will be fairly simple: most usually, a phase function such as:

$$e^{jk(u2+v2)} \text{ or } e^{jk(u2+v2)2}$$

will be suitable, with k as a numerical coefficient which is a function of the size of the correction to be made, j is the imaginary number that is a square root of $-1$ and u and v are variables (spatial frequency and temporal frequency or exceptionally two spatial frequencies) of the Fourier transform to be corrected.

Such functions, applied to a Fourier transform, enable the very easy correction of the spherical aberrations of objectives or of other defects such as misalignment defects. The focusing defects may also be corrected.

Finally, one aspect of the invention lies in the constitution of the optical disks which could used with the original reading system proposed herein. According to the invention, there is proposed a disk comprising circular adjacent tracks with an inter-track space having zero width or a width that is far smaller than the width of a track.

BACKGROUND OF THE INVENTION

Other features and advantages of the invention will emerge from the following detailed description, made with reference to the appended drawings, of which:

MORE DETAILED DESCRIPTION

Figure 1:
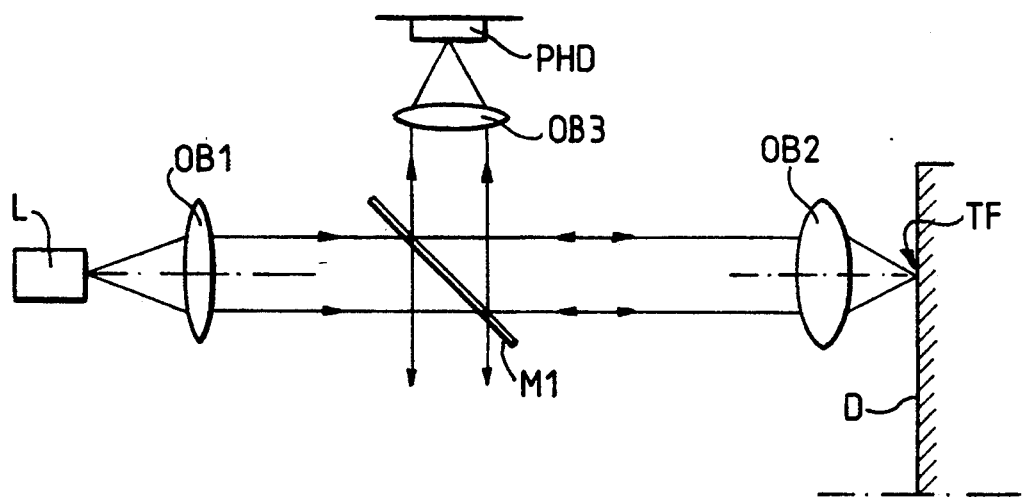
FIG. 1 shows a schematic diagram of a conventional optical disk reader.

FIG. 1 schematically recalls the constitution of a conventional optical disk reader: a laser L emits a beam that is collimated by an optical system OB1, and directed in parallel beam form towards a semi-transparent mirror M1 inclined at 45°, which is used essentially to separate the reflected beam from the incident beam so as to send only the reflected beam on towards a photodetector.

A part of the incident beam crosses the mirror M1 but another part is deflected by 90° (downwards in FIG. 1). The deflected part is lost. The undeflected part is directed towards the disk D which contains the information elements to be read, stored in optical form. This undeflected part is focused by a wide-aperture optical system OB2 on a very small surface of the disk D (with a focusing spot TF having a diameter of some micrometers).

The disk is located in the transversal plane with respect to the incident beam, and it rotates about an axis that is perpendicular to this plane and laterally offset with respect to the optical axis of the system OB2. The rotation of the disk therefore enables the focusing spot to scan a circular track on the surface of the disk. Mechanical means (not shown) enable the rotational axis of the disk to be offset variably in relation to the axis of the incident beam, so that the disk may comprise numerous concentric circular tracks and so that the desired track can be chosen.

The laser beam focused on the surface of the disk is reflected with a reflection coefficient that is a function of the information stored in the disk. Since the disk rotates, there is a temporal modulation of the reflection coefficient as a function of the moving past of information elements on the explored track.

The reflected beam thus modulated again crosses the optical system OB2. It reaches the semi-transparent mirror at 45° M1 and is sent on at 90°, this time towards the top of the figure, towards an optical focusing system OB3 and, behind this system, towards a photonsensitive diode PHD. The diode PHD gives an electrical signal, the modulation of which represents the energy modulation of the reflected beam while the disk is moving past beneath the laser beam.

Figure 2:
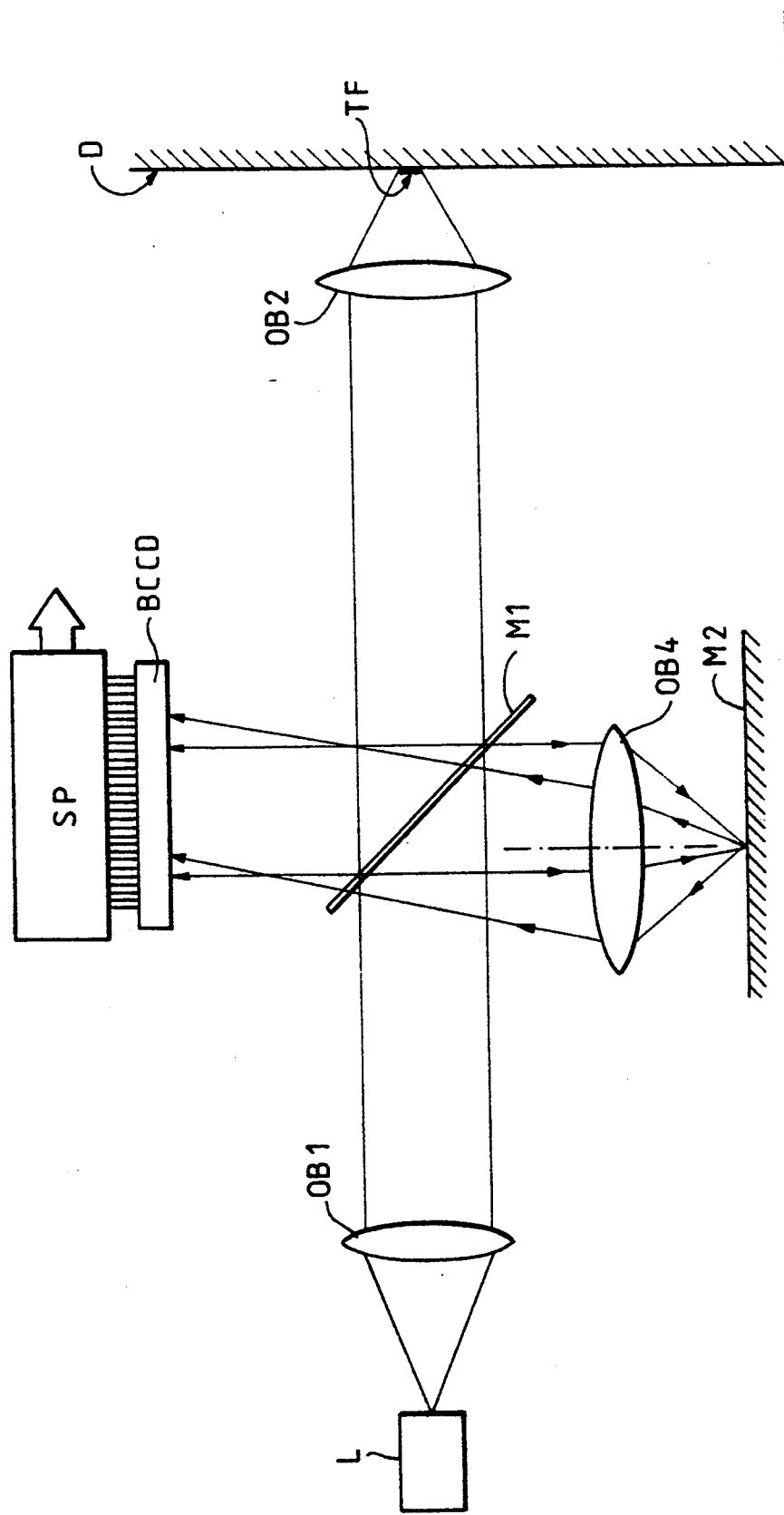
FIG. 2 shows a schematic diagram of a reader according to the invention.

The basic structure of the optical disk reader according to the invention is shown in FIG. 2, with the same numerical references as in FIG. 1, for the corresponding elements. It has two characteristic features: firstly, the portion of the incident beam that was lost by the mirror M1 is re-used and compounded with the reflected beam modulated by the optical information elements to be read; secondly, the conversion of luminous energy into electrical energy is done not by the photodiode alone but by a a set of photodiodes designated by the general reference BCCD.

More specifically, that part of the incident beam which is not directed towards the objective OB2 and then towards the disk, and which is deflected by 90° by the semi-transparent mirror M1, is directed to an optical system OB4 and, behind this objective, towards a mirror M2 which sends this beam back upwards. The beam sent back by the mirror M2 again crosses the optical system OB4 and is directed towards a region at which there also arrives the reflected beam modulated by the disk. In practice, the region in which the unmodulated beam and the modulated beam may get mixed will be located behind the semi-transparent mirror M1: the modulated beam is sent on by the mirror M1 at 90° upwards in the figure and the unmodulated beam crosses the mirror M1 upwards.

The mirror MI could be replaced by another type of separator dividing the beam into two parts.

In this region, the set of photodetectors BCCD is positioned in order to detect not the total energy concentration of a beam but the spatial distribution of energy in a zone where there is interference between two beams of coherent light, one modulated and the other unmodulated. It should be noted, in this respect, that the light source L is a coherent light source whereas the prior art system, which also uses a laser, does not however use its properties of coherence.

It should be clearly understood that the beam paths indicated in FIG. 2, resulting from the presence of two mirrors M1 and M2 and objectives OB1, OB2 and OB4, are given purely by way of an example. Other configurations of equipment and of beams could be adopted provided that the unmodulated beam of coherent light and the beam modulated by the information elements to be read are made to interfere in one and the same zone in which the set of photodetectors will be placed.

The set of photodetectors BCCD should normally be a 2D matrix of photodetectors in order to detect the distribution of energy in two dimensions. However, if the information storage means used is a rotating disk, therefore one that gives a temporal modulation of information elements, then a linear array of photodetectors will be used.

To complete the description of FIG. 2, it should also be pointed out that, in the interference zone, it is desirable to incline the general direction of the unmodulated beam with respect to the general direction of the modulated beam. This is easily obtained by means of appropriate optical systems. For example, a lateral offset of the optical axis of an objective of the system OB4 with respect to the axis of the incident beam reaching this objective can be used to obtain an inclination of the unmodulated beam in the zone located above the mirror M1.

The reason for this inclination is that it is necessary to produce marked interference fringes that can be detected by the set BCCD. For a linear array, the angle of inclination of one beam with respect to the other is therefore located in a plane containing the array BCCD. This array BCCD is furthermore positioned, on the whole, transversally with respect to the beams so that the interference fringes are distributed on this array.

It will thus be seen that the two beams of coherent light have been used to make a hologram of the disk seen by the laser beam.

Had the laser beam undergone no shift in relation to the surface of the disk, it would be necessary, in order that the hologram might contain all the information relating to the image of the surface of the disk seen by the beam, for it to extend in a 2D plane (observable by a photosensitive matrix) in which the information elements would be represented by spatial frequencies in both dimensions. However, since the disk rotates, one of the dimensions of the information may be represented by time, and consequently one of the dimensions of the hologram may be represented by a temporal frequency. This is why it is possible to be satisfied with a linear array of photodiodes, provided that the electrical signals coming from the array are analyzed in the temporal frequencies domain. The presence of numerous detectors in the array enables the analysis of the interference fringes in the spatial frequencies domain, giving the other dimension of the desired information.

The photosensitive array is connected to a signal processing circuit SP which, at its output, gives information elements representing the information elements stored in the disk. This processing circuit has, first of all, the function of the restoring, in the real space/time domain, of the information elements that are available in the array in holographic form. It will notably carry out the conversion, by Fourier transform, of the spatial/temporal electrical signals into signals representing the domain of the spatial and temporal frequencies. Secondly, it may carry out signal processing operations in this frequency domain, especially to make corrections of faults in the optical systems.

At its output, the processing circuit SP gives signals directly representing the information content of the optical disk, which can be used in various ways depending on the application: restitution of sound, video images, computer data etc.

The processor SP carries out the following processing operation in the case of a linear array and a rotating disk: on the basis of the amplitudes S(x,t) of the electrical signals coming from the different detectors, representing the light energy received by the detector located on the abscissa x in the array, at the time t, it performs the Fourier transform F(u,v) of the signals S(x,t).

u is the variable in the spatial frequencies domain that corresponds to the variable x in the real space domain;

v is the variable in the temporal frequencies domain that corresponds to the real temporal variable t.

The signals S(x,t) represent the energy distribution in the zone of the interference fringes produced by the composition between the modulated beam of coherent light and the same beam unmodulated.

The Fourier transform F(u,v) represents these same fringes without loss of information but in the spatial and temporal frequencies domain.

When the Fourier transform F(u,v) is had, a translation of coordinates is carried out with respect to the spatial frequencies variable u: the new original coordinates are u'=u+uO and v'=v.

This translation in the plane of the spatial frequencies amounts to shifting the frequency spectrum without modifying it. The shift is chosen such that it is equal to the frequency of the reference laser. This means quite simply the elimination of the influence of the presence of the unmodulated laser beam and the keeping, in the spectrum, of only the information elements resulting from the modulation of the beam by the optical information elements to be read.

A filtering operation may then be carried out to limit the spectrum obtained to the components corresponding to the direction and dimensions of the pupil of the objective for focusing the laser beam on the disk.

It is also possible, at this stage, to carry out a signal processing operation to correct the optical defects of the system. The easiest defects to correct are those that can be rectified by the use of a quadratic phase function of the following type:

$$e^{jk(u'^2+v^2)} \text{ or } e^{jk(u'^2+v^2)^2}$$

where j is the pure imaginary number with an amplitude 1;

k is a coefficient representing the amplitude of the desired correction.

Other corrections may be introduced. The value of these corrections is that they are made in the frequency (spatial and temporal frequency) domain and that the optical type defects may sometimes be expressed more simply in the frequency domain than in the real domain.

Finally, a reverse Fourier transform is carried out for the retrieval, from the function F(u'v) corrected if necessary, of a function G(z,t) of two real variables, a spatial variable (z) and a temporal variable (t). This function represents the variation in time of an optical information element located on the abscissa z, measured along a radial disk segment illuminated by the laser beam.

The focusing spot of the laser beam may simultaneously illuminate one or more adjacent tracks on the radial segment. The output signal resulting from the reverse Fourier transform will correspond to these different tracks which correspond to different abscissae z regions. A selection of a determined track could therefore be done at the output of the processing circuit SP. For this purpose, the function G(z,t) will be selected for certain ranges of values of z. It is even possible, according to the invention, to read several tracks simultaneously (reading in stereo mode, etc.). In other words, given that the signal processing operation done will reveal the different tracks side by side by providing modulations G(z,t) that are different according to the zones z considered, it is not necessary, as it is in the prior art, for the focusing spot to be as small as the width of a track.

The consequence thereof is that, for a same focusing spot dimension, the tracks may be smaller than in the prior and therefore greater in number on a same surface area of disk.

Furthermore, whereas the prior art dictated the need for a reference surface between tracks to give a reflection coefficient reference in the absence of any hole in the track, it is now possible to read juxtaposed tracks without any reference surface between them. Here again, this enables an increase in the information storage density.

Another advantage lies in the fact that the mechanical servo-control of the beam can be less precise and that it is possible to be satisfied with an approximate servo-control of the focusing (heightwise servo-control with respect to an external surface of the disk) since the focusing defects can be corrected by electronic processing on the Fourier transform. Similarly, the radial positioning may be done simply, by the radial drive motor of the laser. It is not necessary for the positioning to be done with precision in relation to the edge of a track as in the prior art (where the beam had to be placed with precision in a straddling position between a track and the adjacent inter-track).

Figure 3:
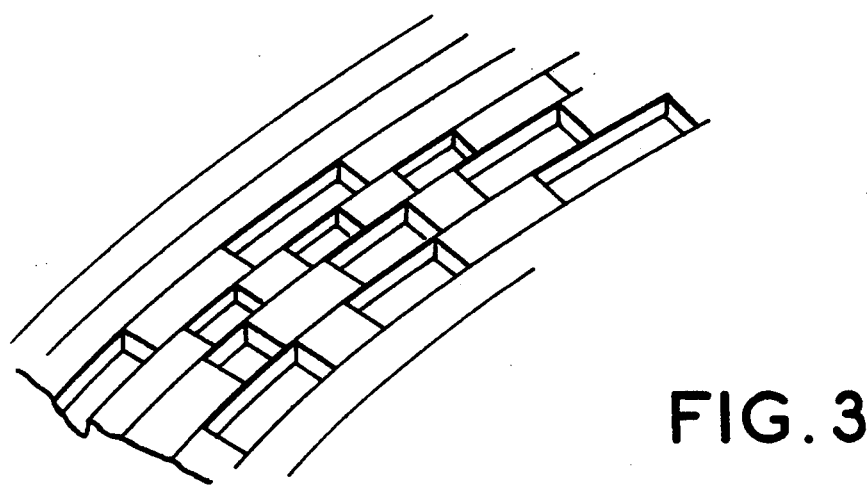
FIG. 3 shows the surface of a storage disk having juxtaposed tracks without inter-track space.

FIG. 3 shows a schematic view of an aspect of the invention which is the original constitution of an optical disk in which the tracks containing the information elements are juxtaposed without any inter-track interval or at least with an interval that is far smaller than the width of the tracks, which was not at all possible in the prior art. The information elements are shown as being holes of variable position and length in tracks of constant width: it is possible, however, to envisage other possibilities, for example local modifications of the refraction index rather than etched holes.

It is also possible to envisage a possibility wherein the disk comprises tracks with a modulation of the depth of etched holes, in addition to the conventional modulation of length and spacing of the holes.

What is claimed is:

1. A system for reading optical information elements comprising:

a laser source for generating a laser source beam;

means for generating a reference laser beam and a reading laser beam from said laser source beam;

means for directing said reading laser beam onto the information elements to produce a modulated laser beam which is said reading laser beam modulated in phase and amplitude by said information elements;

interference means for creating an interference between said reference laser beam and said modulated beam, thereby producing a spatial interference pattern;

detecting means positioned to receive the spatial interference pattern and providing signals corresponding to the spatial interference pattern; and processing means for processing said signals provided by the detecting means so as to recover information corresponding to the optical information elements.

2. A reading system according to claim 1, wherein the reference beam and the modulated beam propagate in directions that are generally oblique with respect to one another in an area in which the detecting means is positioned.

3. A system according to claim 1, wherein the detecting means is an array of photodetectors.

4. A system according to claim 1, further comprising:
said generating means further includes a separating element positioned in the path of the laser source beam for separating the beam into said reference beam and said reading beam;
said interference means further includes a mirror for reflecting the reference beam towards said separating element, and means for directing the modulated beam towards said separating element, said separating element thereby receiving a reflected reference beam and said modulated beam and being disposed so as to direct both the reflected reference beam and the modulated beam towards said detecting means.

5. A system according to claim 4 wherein the processing means comprises:
Fourier transform means to produce a Fourier transform of the signals received by the detecting means;
filtering means to carry out a spatial frequency shift of said Fourier transform thereby producing a shifted Fourier transform; and
reverse Fourier transform means to carry out a reverse Fourier transform of said Fourier transform to yield a signal representing, in real domain, the optical information elements.

6. A system according to claim 5, further comprising:
correction means to correct optical defects of the system that manifest in the modulated beam, said correction means comprising means for processing the shifted Fourier transform.

7. A system according to claim 6, wherein the correction means comprises:
a means to multiply the Fourier transform by a phase function of the type:

$$e^{jk(u2+v2)} \text{ or } e^{jk(u2+v2)2}$$

where k is a numerical coefficient that is a function of the magnitude of the correction to be made, j is the imaginary number that is a square root of $-1$, u and v are variables of the Fourier transform.

8. A system according to claim 1 wherein the processing means comprises:
Fourier transform means to produce a Fourier transform of the signals received by the detecting means;
filtering means to carry out a spatial frequency shift of said Fourier transform thereby producing a shifted Fourier transform; and
reverse Fourier transform means to carry out a reverse Fourier transform of said Fourier transform to yield a signal representing, in real domain, the optical information elements.

9. A system according to claim 8, further comprising:
correction means to correct optical defects of the system that manifest in the modulated beam, said correction means comprising means for processing the shifted Fourier transform.

10. A system according to claim 9, wherein the correction means comprises:
a means to multiply the Fourier transform by a phase function of the type:

$$e^{jk(u2+v2)} \text{ or } e^{jk(u2+v2)2}$$

where k is a numerical coefficient that is a function of the magnitude of the correction to be made, j is an imaginary number that is a square root of $-1$, u and v are variables of the shifted Fourier transform.

11. A system according to any one of claims 10-14 or 5-7, further comprising:
an optical disk including concentric adjacent tracks with an inter-track space between the tracks having a width that is substantially smaller than the width of any one of said tracks.

12. A system according to claim 11, wherein said inter-track space is substantially null.

13. A system according to claim 12, wherein the track further comprises:
holes that are modulated in depth in addition to being modulated in length and spacing.

14. A system according to claim 11, wherein the tracks further comprise:
holes that are modulated in depth in addition to being modulated in length and spacing.

* * * * *